Figure 1:
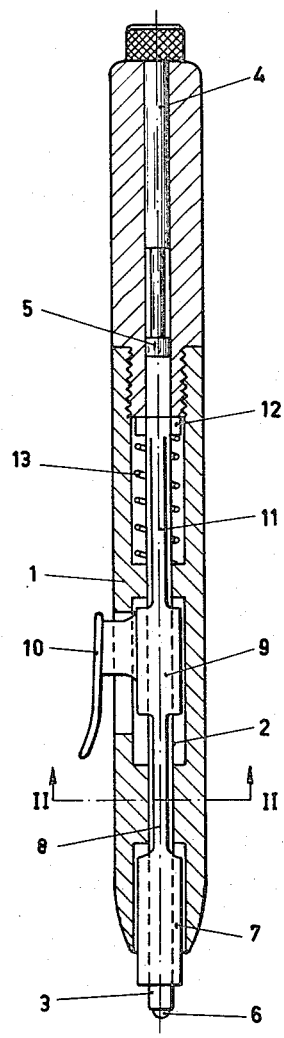

United States Patent [19]
den Hamer

[11] 3,797,875
[45] Mar. 19, 1974

[54] DEVICE FOR HANDLING SMALL OBJECTS
[75] Inventor: Herbert Emile den Hamer, Hague, Netherlands
[73] Assignee: Nederlandse Organisatie Voor Toegespart-Natuurweter-Schappelijk Onderzoek Ten Behoeve Van Nijverheider Handel En Verkeer, The Hague, Netherlands
[22] Filed: Nov. 2, 1971
[21] Appl. No.: 194,841

[30] Foreign Application Priority Data
Nov. 11, 1970 Netherlands...................... 7016527

[52] U.S. Cl. ................................ 294/1 R, 221/210
[51] Int. Cl. .......................... A47f 13/00, B65h 3/20
[58] Field of Search............. 294/1 R, 50, 61, 1 CA; 221/211, 210; 271/33

[56] References Cited
UNITED STATES PATENTS
3,411,364  11/1968  Horley et al. .................... 294/1 CA
2,654,632  10/1953  Herbert............................... 294/116
2,924,481  2/1960   Wagstaff ........................ 294/1 CA
3,526,424  9/1970   Torres................................ 294/61
3,248,006  4/1966   Lowery et al.................221/210 X
317,234    5/1885   Spitzli..........................221/210 X
301,176    7/1884   Spitzli..............................106/126
1,730,126  10/1929  Dailey .........................221/210 X FOREIGN PATENTS OR APPLICATIONS
928,559    6/1963   Great Britain....................271/33
961,371    6/1964   Great Britain....................271/33
2,384,334  9/1945   Olson..........................294/1 CA Primary Examiner—Evon C. Blunk
Assistant Examiner—Hadd Lane
Attorney, Agent, or Firm—Hammond & Littell

[57] ABSTRACT

A pencil-like hand-apparatus for handling small objects of divergent kinds, having an adhesive head for picking up the objects and a stripper for releasing them.

2 Claims, 2 Drawing Figures

PATENTED MAR 19 1974

3,797,875

INVENTOR
HERBERT E. DEN HAMER

BY
ATTORNEY

DEVICE FOR HANDLING SMALL OBJECTS

The invention relates to a device for handling small objects, comprising an oblong holder that at one end is provided with means for holding small objects.

Such devices are used as hand tools in assembling precise mechanical products, so as to pick up the components to be assembled and to bring them into a position appropriate for the assemblage. These devices are already known in the art in various designs, the means for holding the components being formed by clamps, magnetic faces or suction nozzles.

These means have the drawback that their operation is highly dependent on the shape, the size and/or the material of the objects to be picked up, so that for objects of very divergent natures there must be more than one device available. Thus it is, for instance, not possible to pick up with the clamp a thin ring lying on a flat plane, with a magnet a non-magnetic object or with a suction opening a thin helical spring.

It is the object of the invention to provide a device for picking up small objects that has not such restrictions in its field of application, but on the contrary is universally applicable for objects that differ very much in terms of shape and material.

Therefore, the device according to the invention is characterized in that at its end the holder is provided with a sticking surface.

For it has been found that a sticking surface better than the means known so far is able to hold objects that are of a highly different nature with a force that is amply sufficient for the conditions prevailing in assembling.

Preferably, the sticking surface is not provided directly onto the holder, but, with a view to the replaceability and the details still to be described hereinafter, the device is designed such that according to a characteristic of the invention, the sticking surface forms part of a pin protruding from the holder.

The device according to the invention is further characterized in that at least the end of the pin consists of an adhesive that is in a solid or tough-plastic condition, because in this way a very effective adhesive action is obtained. In a preferential embodiment of it the pin consists of a thin-walled small tube in which the adhesive is present and protrudes at the end. Moreover, this device can further be characterized in that the adhesive in the tube can be moved towards the end by means of a pressing screw in the other end of the tube. This offers the possibility of replacing the adhering surface by a new one, by breaking off or cutting off the protruding part of the adhesive and screwing up the pressing screw, for instance when the sticking surface has become dirty and does not have sufficient sticking power any longer.

An appropriate substance to serve as an adhesive is beeswax; there is also an ample choice of suitable substances from the numerous synthetic rubbery adhesives, however.

Because the device must not only be able to hold objects but also to release them again when this is desired, the device according to the invention is still characterized in that alongside the end of the pin a stripper is provided, and the position of the pin in respect of the stripper is longitudinally changeable by means of an operational device such that arbitrarily the end of the pin protrudes beyond the stripper or is situated behind it.

By means of this provision the object sticking to the pin can be pushed or stripped from it by a simple movement of the operational device when the object is situated in the position that is desired or required for the assemblage.

Figure 2:
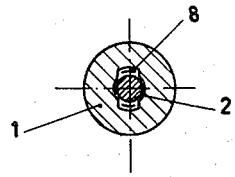

The invention is further elucidated below with reference to the drawing, in which FIG. 1 represents a lengthwise section, and FIG. 2 a cross-section along line II—II in FIG. 1 of a device according to the invention.

In the central bore of holder 1 tube 2 is fixed such that with its lower end 3 it protrudes from holder 1. In the upper end of tube 2 screw 4 with piston 5 is provided. For the rest tube 2 is filled with an adhesive that by moving piston 5 downward with the aid of screw 4 can be made to come out of end 3 of tube 2 until there sticking head 6 has formed.

Around end 3 of tube 2 tube 7 is provided. It is connected by means of strips 8 to tube 9, carrying finger key 10, which protrudes from holder 1, and by means of strips 11 to ring 12, against which spring 13 presses. The whole of tubes 7 and 9, strips 8 and 11 and ring 12 can be slid downward with the aid of key 10 against the pressure of spring 13 so far that end 3 of tube 2 with sticking head 6 is entirely surrounded by tube 7.

The device can be held in the hand like a writing-pen, holding a finger, e.g., the forefinger, on key 10.

If one places the device with sticking head 6 onto an object, then this object remains stuck to sticking head 6 and it can be placed there where one wants it for the assemblage or an other reason. After the object has been placed in the position desired, then it can be detached from sticking head 6, by sliding tube 7 downward by means of key 10 and the device, after tube 7 has been allowed to go upwards by means of spring 13, is ready again to pick up and deliver a following object.

When sticking head 6, for instance by collecting dust and similar particles, has insufficient adhesive power, it is broken off or cut off and piston 5 and the adhesive in tube 2 are pressed downwards by rotating screw 4, until at end 3 a new sticking head 6 has formed.

I claim:

1. A device for handling small objects, comprising an oblong hand held holder having at one end thereof a means for holding small objects comprising a sticking surface forming part of a pin that protrudes from said holder, a stripper provided alongside the end of said pin, and a means for manually changing the longitudinal position of said pin with respect to said stripper, such that the end of said pin can protrude beyond said stripper or be located behind said stripper.

2. A device for handling small objects comprising an oblong holder having at one end thereof a means for holding small objects comprising a thin-walled tube protruding from said holder, said tube containing therein an adhesive providing a sticking surface which protrudes from the end of said tube, said adhesive being in a solid or tough-plastic condition, and pressing screw means at the other end of said oblong holder for moving said adhesive in said tube towards said one end of tube.

* * * * *